United States Patent
Bach et al.

(10) Patent No.: US 11,899,779 B1
(45) Date of Patent: Feb. 13, 2024

(54) NORMALIZING APPLICATION EXTERNAL DATA

(71) Applicant: AppOmni, Inc., San Francisco, CA (US)

(72) Inventors: Timothy Bach, Emeryville, CA (US); Brian Soby, Carbondale, CO (US)

(73) Assignee: AppOmni, Inc., San Francisco, CA (US)

( * ) Notice: Subject to any disclaimer, the term of this patent is extended or adjusted under 35 U.S.C. 154(b) by 57 days.

(21) Appl. No.: 17/546,871

(22) Filed: Dec. 9, 2021

(51) Int. Cl.
*G06F 21/00* (2013.01)
*G06F 21/51* (2013.01)
*G06F 21/62* (2013.01)

(52) U.S. Cl.
CPC .......... *G06F 21/51* (2013.01); *G06F 21/629* (2013.01); *G06F 2221/033* (2013.01)

(58) Field of Classification Search
CPC ... G06F 21/51; G06F 21/629; G06F 2221/033
See application file for complete search history.

(56) References Cited

U.S. PATENT DOCUMENTS

| 2019/0222544 A1* | 7/2019 | Ferrick | H04L 51/046 |
| 2022/0138617 A1* | 5/2022 | Xiao | G06F 9/45558 706/12 |
| 2023/0188431 A1* | 6/2023 | Esposito | H04L 63/102 709/225 |

* cited by examiner

*Primary Examiner* — Ghazal B Shehni
(74) *Attorney, Agent, or Firm* — Van Pelt, Yi & James LLP

(57) ABSTRACT

Normalizing external application data is disclosed, including: receiving external application data associated with an external application; determining normalized metadata based at least in part on inferring from the external application data; and using the normalized metadata to monitor activities at the external application.

18 Claims, 10 Drawing Sheets

FIG. 10

NORMALIZING APPLICATION EXTERNAL DATA

BACKGROUND OF THE INVENTION

Many organizations use a variety of applications, such as software-as-a-service (SaaS) applications to run their business and/or manage their data. Some of these applications can be operated by third-party services and some of the applications are designed specifically for or by an organization for their own use. Due to the bespoke nature of these custom applications, they may include user-defined configurations that are not standardized or match the configurations that are provided by other applications. It would be desirable to manage arbitrary configurations that are used by any type of application.

BRIEF DESCRIPTION OF THE DRAWINGS

Various embodiments of the invention are disclosed in the following detailed description and the accompanying drawings.

FIG. 10 is a diagram showing an example user interface to enable a security actor associated with an organization to configure a rule using a portion of normalized metadata that is derived from external application data associated with an external application.

DETAILED DESCRIPTION

Figure 1:
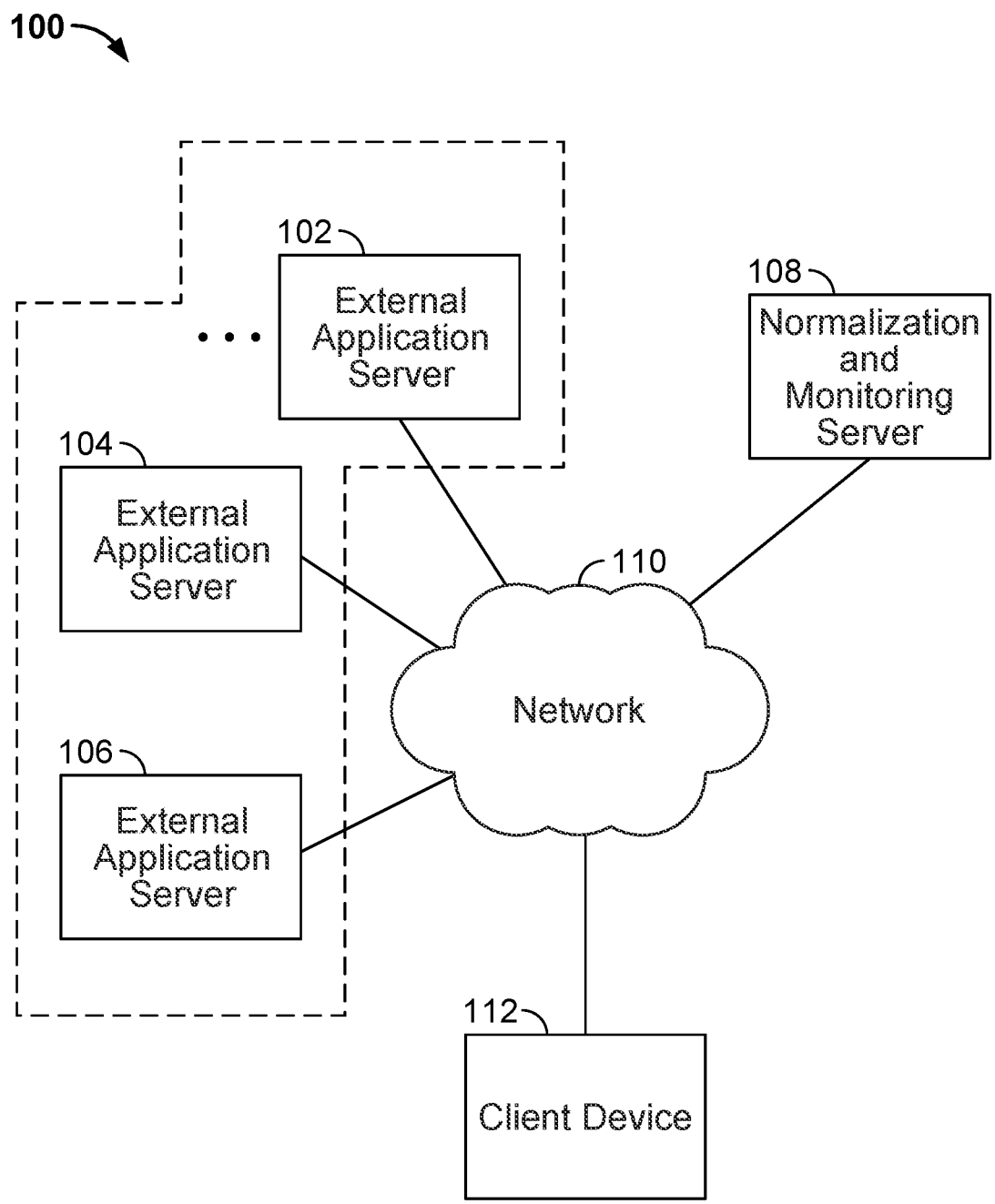
FIG. 1 is a diagram showing an embodiment of a system normalizing and monitoring external application data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of normalizing external application data are described herein. External application data associated with an external application is received. In various embodiments, an "external application" is a software application that provides services to an organization (e.g., an enterprise). For example, an external application can be a SaaS application. In a specific example, an external application can be a SaaS application that is custom designed for a particular organization including by using parameters that are named by or for that particular organization. In various embodiments, "external application data" comprises configurations of a given organization's software instance with the external application. Examples of external application data include system-level settings, user permissions (e.g., role-based access controls (RBAC)), audit events, data settings, access control lists, schema, and schema settings. Normalized metadata data is determined based at least in part on inferring from the external application data. In some embodiments, external application data comprising arbitrary configurations of a given organization's software instance at the external application can be ingested and a set of normalized metadata can be inferred from the identified parameters of the external application data. The normalized metadata is used to determine activities at the external application. In some embodiments, rules that refer to the normalized metadata can be configured such that upon subsequent ingestion of the given organization's external application data from the external application, the subsequently ingested external application data can be compared to the rules to determine matching activity at the external application that can be exposed at a user interface.

As will be described in further detail below, a given organization's external application data associated with an external application can be ingested and mapped to normalized metadata. The normalized metadata can then be referenced in rules that are configured by a security user associated with the given organization at a configuration monitoring platform. The rules can be regularly enforced to monitor activities at the external application by comparing the portion(s) of the organization's current external application data that are mapped to by the normalized metadata that are referenced by the rules against the criteria set out by the rules to detect matching activity or violations of the criteria. Various embodiments described herein enable potentially arbitrary, organization-specific, and non-standard parameters in external application data stored at one or more external applications to be mapped to normalized metadata, of a common format, at a monitoring platform such that the organization-specific parameters at one or more external applications can be uniformly monitored at one monitoring platform.

While examples used herein commonly refer to system-level settings as a form of external application data, it is only one example of external application data and in actual practice, other examples of external application data can be mapped to normalized metadata using the techniques described in various embodiments.

FIG. 1 is a diagram showing an embodiment of a system normalizing and monitoring external application data. System 100 includes external application server 102, external application server 104, external application server 106, normalization and monitoring server 108, network 110, and client device 112. Network 110 may be implemented using data networks and/or telecommunication networks. External application server 102, external application server 104, external application server 106, normalization and monitoring server 108, and client device 112 may communicate to each other over network 110.

Each of external application servers 102, 104, and 106 is configured to store elements and external application data associated with a cloud-based service or a software as a service (hereinafter referred to as "SaaS") platform. In various embodiments, at least some of external application servers 102, 104, and 106 are associated with a different SaaS platform. Examples of services provided by SaaS platforms include file storing, file sharing, customer relationship management, payroll management, employee data management, human resource data management, and financial management. For example, organizations such as enterprises may subscribe to services provided by one or more SaaS platforms to help manage their businesses. An organization's instance of external application data at an external application may include standardized parameters that are used by the external application for other organizations. Alternatively, an organization's instance of external application data at an external application may include arbitrary and non-standard parameters (e.g., that are customized to the organization's particular preferences) that are not used by the external application for other organizations. By subscribing to a SaaS platform, an actor (e.g., an administrative user) on behalf of an organization stores elements (e.g., personal data, customer data, employment data) with the SaaS platform at the SaaS platform's corresponding external application server. Furthermore, for example, the administrative user on behalf of his or her organization is to also configure parameter values corresponding to the defined parameters at a particular SaaS platform. In various embodiments, a "parameter" comprises a (e.g., system-level) setting, a user permission, an event, or a user-defined configuration. In various embodiments, an "actor" comprises a user, a system, a machine, an image, a process, an application, an account, or a combination of one or more of the above.

Normalization and monitoring server 108 is configured to ingest a given organization's external application data that is stored at one or more external application servers (e.g., such as external application servers 102, 104, and 106) and then infer normalized metadata from the ingested external application data. In some embodiments, normalization and monitoring server 108 is configured to obtain the organization's external application data via a web address (e.g., URL) along with an authentication scheme that are provided by the organization. In some embodiments, normalization and monitoring server 108 is configured to obtain the organization's external application data via an ingestion endpoint along with an authentication scheme that are provided by the organization. In some embodiments, the external application data is in the JSON format. In various embodiments, the external application data that is obtained from a corresponding external application data server comprises at least key-value pairs comprising parameters and parameter value pairs. In a specific example, if the external application data was the organization's system-level settings at the corresponding external application, then the external application data may comprise a parameter related to whether the multi-factor authentication is required of their users, a parameter related to the length of an inactive session prior to timing out the user, a parameter related to whether single-on is permitted for users, among others. The ingested external application data also includes the organization's actual configured parameter values corresponding to the parameters. Returning to the specific example where the external application data comprises system-level settings, the organization's configured parameter values corresponding to the parameters described above can be a "true" value corresponding to the parameter related to whether the multi-factor authentication is required of their users, a "1 hour" value corresponding to the parameter related to the length of an inactive session prior to timing out the user, and a "False" value corresponding to the parameter related to whether single-on is permitted for users. The names and types of the parameters that appear within the external application data may be non-standard because they could have been custom-defined for the organization and as such, they may vary between different organizations.

To infer normalized metadata from the obtained/ingested external application data associated with the given organization with respect to a corresponding external application, in some embodiments, normalization and monitoring server 108 is configured to apply one or more inference techniques on the external application data. A first example inference technique is to compare the parameters and/or the parameter values of the external application data to templates associated with normalized metadata to determine matches. A second example inference technique is to compare the parameters and/or the parameter values of the external application data to predetermined keywords or root words associated with normalized metadata to determine matches. A third example inference technique is to apply natural language processing (NPL) to determine parameters and/or the parameter values of the external application data that match normalized metadata. A fourth example inference technique is to use the parameter value to determine a data type of the parameter (e.g., a timestamp, an integer, a Boolean, or a string). In the specific example where the external application data is system-level settings, then the normalized metadata can comprise normalized system-level settings including for each normalized system-level setting one or more of, but not limited to, the following: a setting name, a setting value, and a set of attributes (e.g., a data type, a category, a risk level, a relative compliance standard, and a possible set (e.g., range) of setting values). In some embodiments, the types of normalized metadata (e.g., settings) are predetermined or configured by an administrator actor (e.g., an administrator user) associated with normalization and monitoring server 108. In some embodiments, the types of attributes to infer for each normalized system-level setting are predetermined or configured by an administrator user associated with normalization and monitoring server 108. In some embodiments, normalization and monitoring server 108 is configured to build a model associated with the organization's external application data with respect to the corresponding external application using the determined normalized metadata. In some embodiments, normalization and monitoring server 108 is configured to store mappings between the normalized settings in the normalized metadata and the parameters in the external application data associated with an external application. For example, the mappings can be stored at normalization and monitoring server 108, the corresponding external application server, and/or at a third location that is accessible by normalization and monitoring server 108.

In some embodiments, normalization and monitoring server 108 is configured to present the normalized metadata at a user interface (e.g., that is presented at a client device such as client device 112) for an (e.g., administrative security) actor associated with the organization. The actor associated with the organization can provide user edits to the normalized metadata to correct any incorrectly or inaccurately inferred normalized metadata. In various embodiments, user submitted edits at a user interface to inferred normalized metadata is referred to as "user authoritative data" and is saved to the model. As will be described in further detail below, portions of the normalized metadata in a model of the organization's external application data with respect to a corresponding external application that have been updated with user authoritative data are no longer updated through inference (e.g., because the user authoritative data that is submitted by an actor on behalf of the organization has supplanted those corrected inferred normalized metadata features). In some embodiments, normalization and monitoring server 108 is configured to regularly ingest the organization's current external application from the corresponding external application server and then perform inference (e.g., on any new or updated sections) to update the existing normalized metadata of the model.

Furthermore, normalization and monitoring server 108 is configured to enable a security actor associated with the given organization to create rules that refer to at least a portion of the normalized metadata and also specify a set of criteria. After normalized metadata has been mapped to the corresponding portions (e.g., parameters) in the external application data through the inference process as described above, normalization and monitoring server 108 is configured to present a user interface (e.g., that is presented at a client device such as client device 112) for a security actor associated with the organization to configure one or more rules that specify a set of criteria associated with one or more features of the normalized metadata. In some embodiments, the user interface will permit different types of rules to be configured for different types of normalized metadata. For example, if normalized setting ABC is inferred to be associated with a Boolean (true or false) data type, then normalized setting ABC is limited to being included in rules with a criterion that specifies that the normalized setting value should only be either "true" or "false." In another example, if normalized setting DEF is inferred to be associated with a timestamp data type, then normalized setting DEF is limited to being included in rules with a criterion that specifies that the normalized setting value should be equal, greater than, or less than a specified length of time.

Normalization and monitoring server 108 is configured to (e.g., periodically) evaluate each rule by comparing the set of criteria associated with the rule against the relevant portion of the given organization's external application data that maps to the specified normalized metadata that is referred to in the rule. In some embodiments, normalization and monitoring server 108 is configured to evaluate each rule based on the external application data that is ingested from the corresponding external application server. In some embodiments, normalization and monitoring server 108 is configured to perform inference to update the existing normalized metadata and evaluate existing rules on each instance of external application data that is ingested/obtained from the corresponding external application server. For example, portions of the external application that match the set of criteria associated with a rule may indicate a violation of a desired parameter value or another security event in the configured parameter value that is found in the external application data. In another example, portions of the external application that match the set of criteria associated with a rule may indicate parameter values in the external application data that are of interest to be presented to the security team of the organization. Normalization and monitoring server 108 is configured to present information associated with the portions of the external application that match the set of criteria associated with a rule at a user interface (e.g., that is presented at a client device such as client device 112) so that the security team of the organization can monitor the external application data in a programmatic manner.

Figure 2:
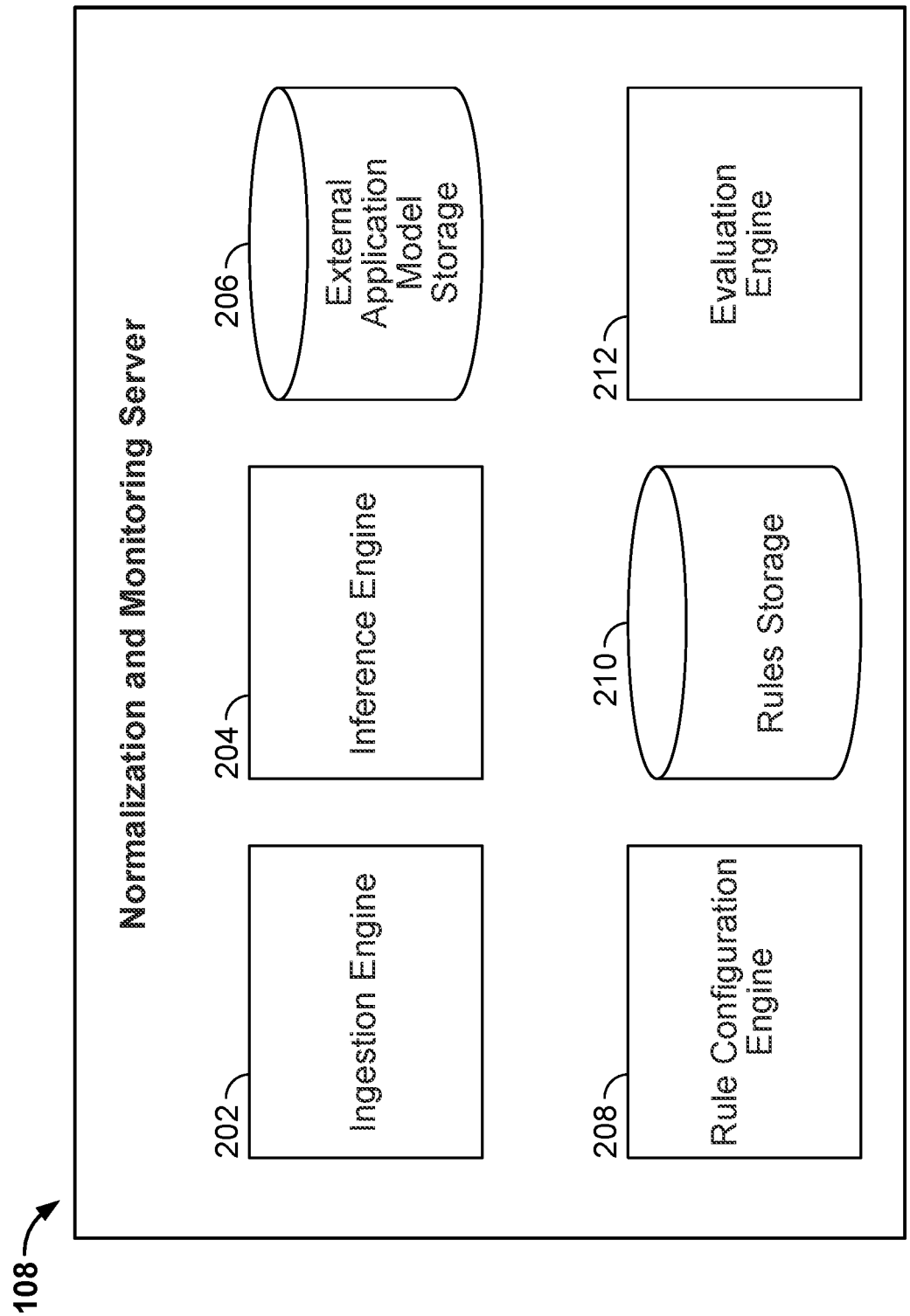
FIG. 2 is a diagram showing an example of a normalization and monitoring server.

FIG. 2 is a diagram showing an example of a normalization and monitoring server. In some embodiments, normalization and monitoring server 108 of system 100 of FIG. 1 may be implemented using the example shown in FIG. 2. The example normalization and monitoring server as shown in FIG. 2 includes ingestion engine 202, inference engine 204, external application model storage 206, rule configuration engine 208, rules storage 210, and evaluation engine 212. Each of ingestion engine 202, inference engine 204, rule configuration engine 208, and evaluation engine 212 may be implemented using hardware (e.g., a processor) and/or software. Each of external application model storage 206 and rules storage 210 may be implemented using a database or any type of storage medium.

Ingestion engine 202 is configured to obtain a given organization's external application data (associated with that organization's service instance/account) that is stored at the server of a corresponding external application. As mentioned above, an example external application is a SaaS platform. In some embodiments, ingestion engine 202 uses authentication information that is provided by the organization to query the external application server for the organization's external application data. In some embodiments, ingestion engine 202 is configured to ingest the external application data from a URL that is provided by the organization. In some embodiments, ingestion engine 202 is configured to ingest the external application data from an endpoint that is provided by the organization. In some embodiments, the external application data, while potentially including arbitrary or customed configured parameters, is formatted in a way that conforms to an application programming interface (API) that is associated with the normalization and monitoring server. In some embodiments, the external application data is formatted based on a checklist, compliance standard, or template that was provided in advance by the normalization and monitoring server to ensure that the parameters that need to be mapped to normalized metadata are present and are also located in a certain section/sequence of the external application data. Nevertheless, the external application data does not need to be formatted in any particular way in order for the inference process to be performed.

In some embodiments, ingestion engine 202 is configured to ingest the given organization's current external application data from the server of a corresponding external application periodically (e.g., based on a configured interval) or in response to a triggering event (e.g., a user instruction). As will be described below, in some embodiments, each instance of the current external application data from the server of a corresponding external application is processed by one or both of inference engine 204 and evaluation engine 212.

Inference engine 204 is configured to generate normalized metadata that is usable to perform monitoring of activities at the external application from the given organization's ingested external application data. In some embodiments, inference engine 204 is configured to analyze parameters/ parameter values, events, user permissions, or other configurations that are described in the external application data and infer values corresponding to normalized metadata based on the analyzed data. Where the external application data comprises system-level settings that are parameter-parameter value pairs, for example, inference engine 204 is configured to analyze each pair of parameter and parameter values to determine, for example, one or more of, but not limited to, the following: a setting name, a setting value, and a set of attributes (e.g., a data type, a category, a risk level, a relative compliance standard, and a possible set (e.g., range) of setting values). In some embodiments, the types of normalized metadata (e.g., settings) are predetermined or configured by an administrator user associated with the normalization and monitoring server. In some embodiments, the types of attributes to infer for each normalized system-level setting are predetermined or configured by an administrator user associated with the normalization and monitoring server. In one example of an inference technique to apply to system-level settings is to compare the parameters and/or the parameter values of the external application data to predetermined keywords or root words associated with normalized system-level metadata (e.g., "MFA," "multifactor," "authentication," "2FA," "timeout," "session," etc.) to determine matches. Once a match is determined between a root word (e.g., "MFA") of a normalized system-level setting and a parameter (e.g., "mfa_req"), then the value of the normalized system-level setting (e.g., that is associated with indicating whether multifactor authentication is required of users to access the external application) in the normalized metadata is populated with the parameter value (e.g., "true") of the matching parameter (e.g., "mfa_req") from the external application data. Furthermore, the attribute values of one or more predetermined attributes (e.g., a data type, a category, a default risk level, a relative compliance standard, and a possible set (e.g., range) of setting values) of a normalized setting are inferred by inference engine 204 from one or more of the parameter to which the normalized setting was found to match, the parameter value, and the external application. In some embodiments, inference engine 204 is configured to store mappings between normalized settings in the normalized metadata with their corresponding parameters in the external application data. Mappings (e.g., comprising control IDs) between normalized settings in the normalized metadata with their corresponding parameters in the external application data can be stored by inference engine 204 as locations of the relevant parameters in the external application server in the normalization and monitoring server, the locations of the relevant normalized metadata settings at the external application server, or both.

In some embodiments, inference engine 204 is configured to present the normalized metadata that has been inferred from the given organization's external application data at a user interface that is provided to a client device associated with a security actor of the organization. The security actor of the organization can, optionally, submit user edits to the presented normalized metadata to correct/update any inferred normalized settings/attributes thereof with user authoritative data. For example, the default risk level attribute associated with the normalized setting associated with indicating whether multifactor authentication is required of users to access the external application is inferred to be "low," but the security actor associated with the organization submits a user edit to change the value of the default risk level to be "high." Therefore, the default risk level attribute associated with the normalized setting associated with indicating whether multifactor authentication is required of users to access the external application is then associated with the user authoritative data of "high."

In some embodiments, inference engine 204 is configured to store the given organization's inferred normalized metadata along with user authoritative data as a model associated with that organization and the associated external application at external application model storage 206. As mentioned above, ingestion engine 202 can repeatedly (e.g., at configured intervals) obtain new sets of current external application data and so inference engine 204 can analyze (e.g., the new and/or changed portions) each subsequent set of external application data to determine updated normalized metadata. Inference engine 204 can then perform inference on each subsequent set of external application data to determine any updated normalized metadata and then update the existing model. In some embodiments, if inference engine 204 determines that a parameter in the external application data is mapped to normalized settings with any user authoritative data (e.g., as indicated in the model stored at external application model storage 206), then inference engine 204 will not make inferences on that parameter to replace/update the user authoritative data.

Rule configuration engine 208 is configured to present a user interface that is configured to enable a security actor of the given organization to configure one or more rules for monitoring activity at one or more external applications. In some embodiments, the user interface that is presented by rule configuration engine 208 allows the security user to select a portion of normalized metadata and specify a set of criteria for that selected portion of the normalized metadata. For example, the set of criteria may specify desired parameter value(s) of the parameter(s) of the external application data that map to the selected portion of the normalized metadata. In another example, the set of criteria may describe parameter value(s) of the parameter(s) of the external application data that map to the selected portion of the normalized metadata that is of interest. In some embodiments, depending on the portion of normalized metadata that is selected by the security actor at the user interface, rule configuration engine 208 may limit the type of criteria that the security actor can configure for that rule. For example, where the selected normalized system-level setting is related to requiring the use of multifactor authentication to the external application and has an inferred data type of Boolean, rule configuration engine 208 may limit the rules that the security actor can configure to only those that specify criteria related to Boolean values. For example, a configured rule that includes a selected normalized system-level setting is related to requiring the use of multifactor authentication also specifies that the value can never be "false." Put another way, the rule specifies a criterion that if the parameter value of the parameter of the external application data that maps to the selected normalized system-level setting is false, then the parameter is in violation of the rule and therefore becomes matching activity. In some embodiments, rule configuration engine 208 is configured to programmatically configure rules for an organization based on the existing normalized metadata and then present such rules at the user interface for the security actor to select and implement. Rule configuration engine 208 is configured to store the configured rules to implement for an external application on behalf of an organization to rules storage 210.

Evaluation engine 212 is configured to evaluate rules (e.g., stored at rules storage 210) against the given organization's external application data associated with an external application. As described above, ingestion engine 202 is configured to repeatedly ingest current sets of the organization's external application data associated with an external application. In some embodiments, in addition to inference engine 204 performing inference on the ingested external application data, evaluation engine 212 is also configured to evaluate the ingested external application data against configured rules. As described above, each rule specifies a selected portion of the normalized metadata and also a set of criteria. To evaluate a rule, evaluation engine 212 is configured to use stored mappings between the specified portion of the normalized metadata and the relevant portion (e.g., parameter(s)) of the external application data to obtain the parameter values of the external application data and then compare the parameter values against the set of criteria of the rule. If the mapped to parameter values of the external application data match the set of criteria, then evaluation engine 212 is configured to present information related to the matching activity at a user interface for a security actor associated with the organization to consume. To evaluate the example rule described above where the rule specifies a criterion that the parameter value of the "mfa_req" parameter of the external application data that maps to the multifactor authentication normalized system-level setting cannot be false, evaluation engine 212 is configured to determine whether the parameter value of the "mfa_req" parameter of the ingested external application data is false and if so, outputs an event (e.g., indicating a violation of the rule) at the user interface to alert the security actor to change the parameter value of the "mfa_req" parameter of the external application data to the desired setting of "true." Evaluation engine 212 can expose via the user interface violations/matching activities/anomalous behavior at the external application relative to configured rules to programmatically monitor the external application data using the inferred normalized metadata.

Figure 3:
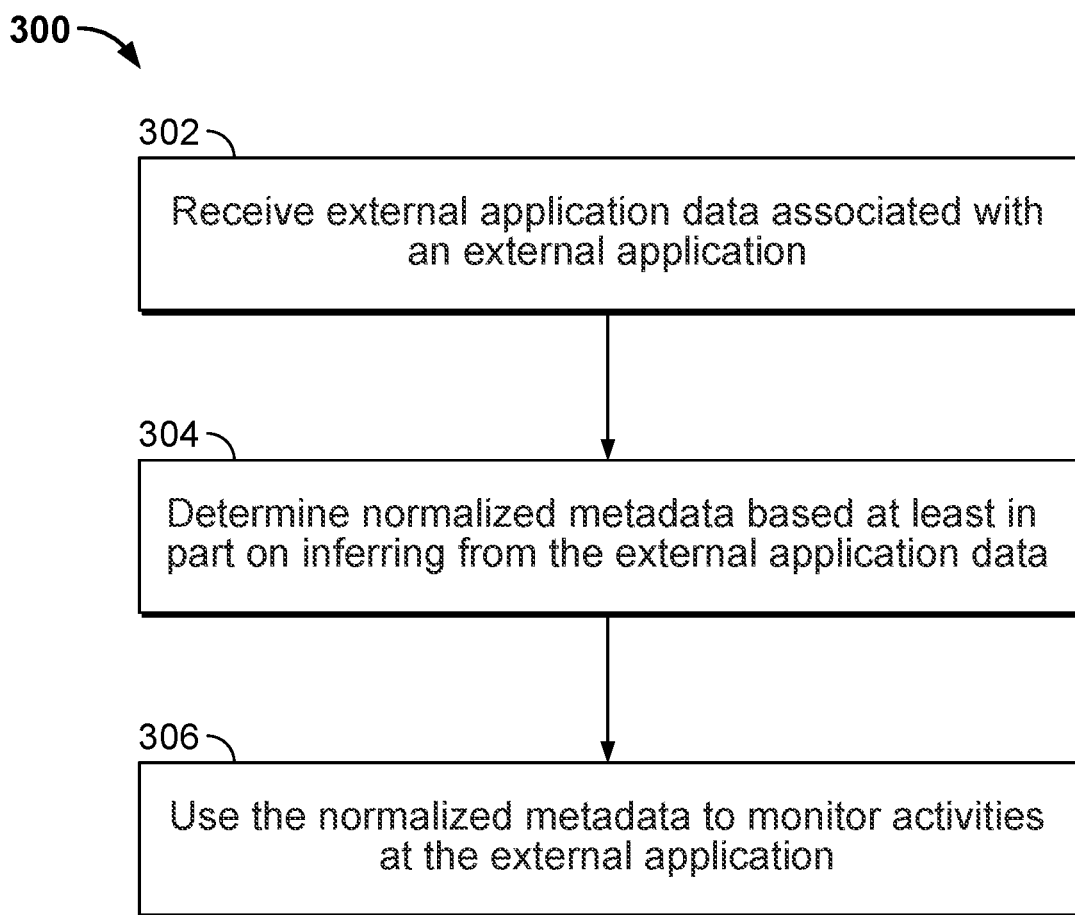
FIG. 3 is a flow diagram showing an embodiment of a process for normalizing external application data.

FIG. 3 is a flow diagram showing an embodiment of a process for normalizing external application data. In some embodiments, process 300 is implemented at a normalization and monitoring server such as normalization and monitoring server 108 of FIG. 1.

At 302, external application data associated with an external application is received. A given organization's external application data is ingested from a server associated with the external application. Some examples of the external application data include system-level settings, user permissions, audit events, data settings, access control lists, schema, and schema settings. For example, the external application data may include arbitrarily-defined/named parameters.

At 304, normalized metadata is determined based at least in part on inferring from the external application data. The external application data is analyzed to infer parameters that match to corresponding ones of features (e.g., settings) of normalized metadata. Furthermore, one or more inference techniques are performed on the parameters of the external application data to infer attributes associated with the features of normalized metadata. In some embodiments, mappings are stored between parameters in the external application data and corresponding features (e.g., settings) in the normalized metadata.

At 306, the normalized metadata is used to monitor activities at the external application. In some embodiments, rules that reference portions/features of the normalized metadata and also specify a set of criteria can be configured at a user interface. The rules are periodically evaluated against the organization's current external application data. In some embodiments, evaluating a rule involves using the mappings between the portions/features of the normalized metadata and the relevant parameters of the current external application data to compare the parameter values of those parameters to the set of criteria of the rule. If the parameter values match the set of criteria, then they form matching activity to that rule and information associated with the matching activity can be presented at a user interface (e.g., for a security actor of the organization to consume). As described above, the matching activity can denote merely information of interest to the security actor(s) or violations of desired configurations/parameter values within the external application data at the external application.

Figure 4:
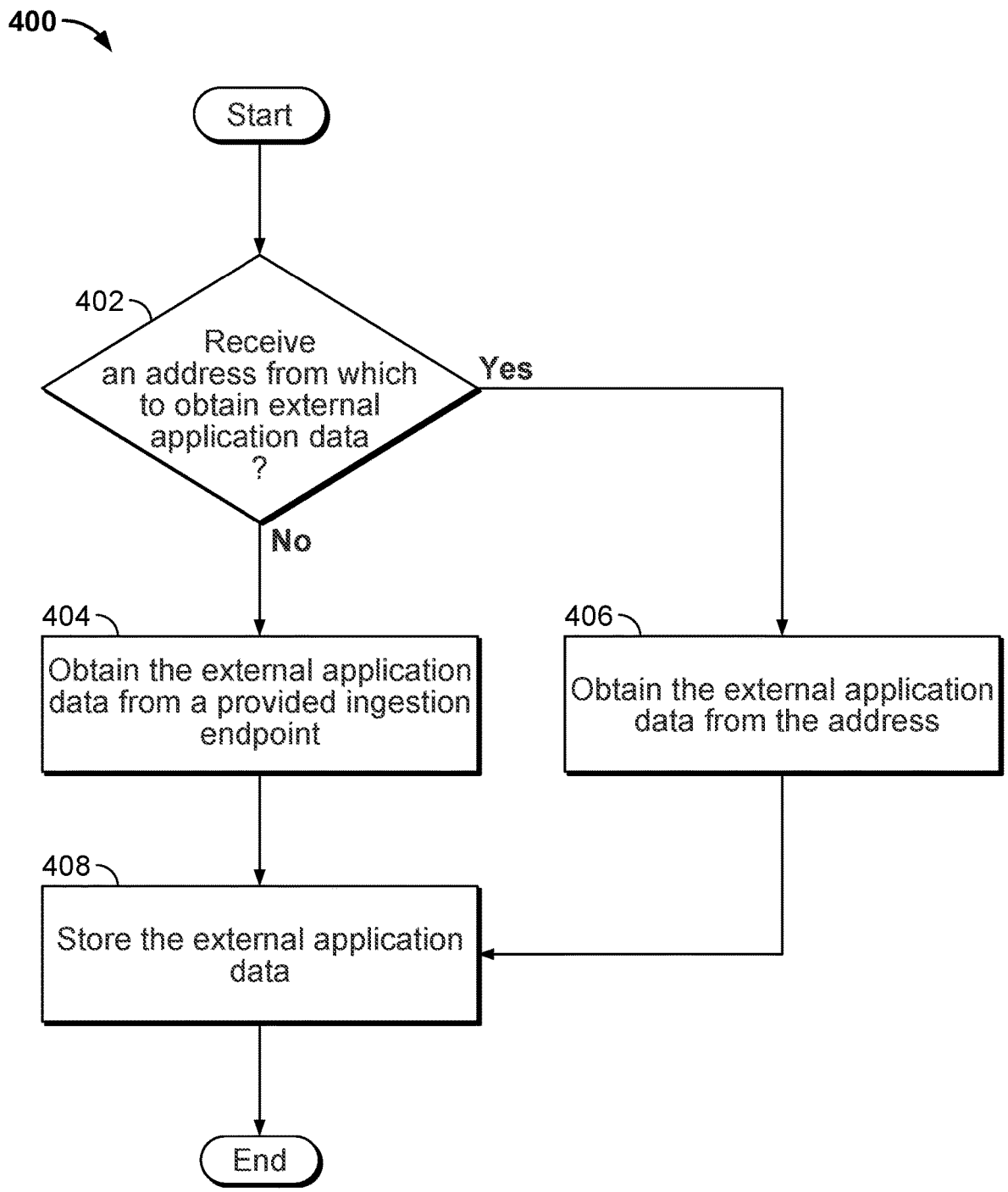
FIG. 4 is a flow diagram showing an example of a process for ingesting external application data.

FIG. 4 is a flow diagram showing an example of a process for ingesting external application data. In some embodiments, process 400 is implemented at a normalization and monitoring server such as normalization and monitoring server 108 of FIG. 1. In some embodiments, step 302 of process 300 of FIG. 3 may be implemented using process 400.

At 402, an address from which to obtain external application data is received. In the event that an address from which to obtain external application data is received (e.g., via being provided by an organization whose external application data is to be ingested), control is transferred to 406. Otherwise, in the event that an address from which to obtain external application data is not received, control is transferred to 404. For example, the organization can provide a URL and an authentication scheme for the normalization and monitoring server to obtain the external application data from a server associated with the corresponding external application.

At 404, the external application data is obtained from a provided ingestion endpoint. Alternative to obtaining the external application data from a server associated with the corresponding external application, the organization could have provided the normalization and monitoring server an endpoint for ingesting the external application data.

At 406, the external application data is obtained from the address.

At 408, the external application data is stored. The external application data can be (e.g., temporarily stored and) used for inferring an updated set of normalized metadata and/or evaluated against configured rules that reference features of the normalized metadata.

Figure 5:
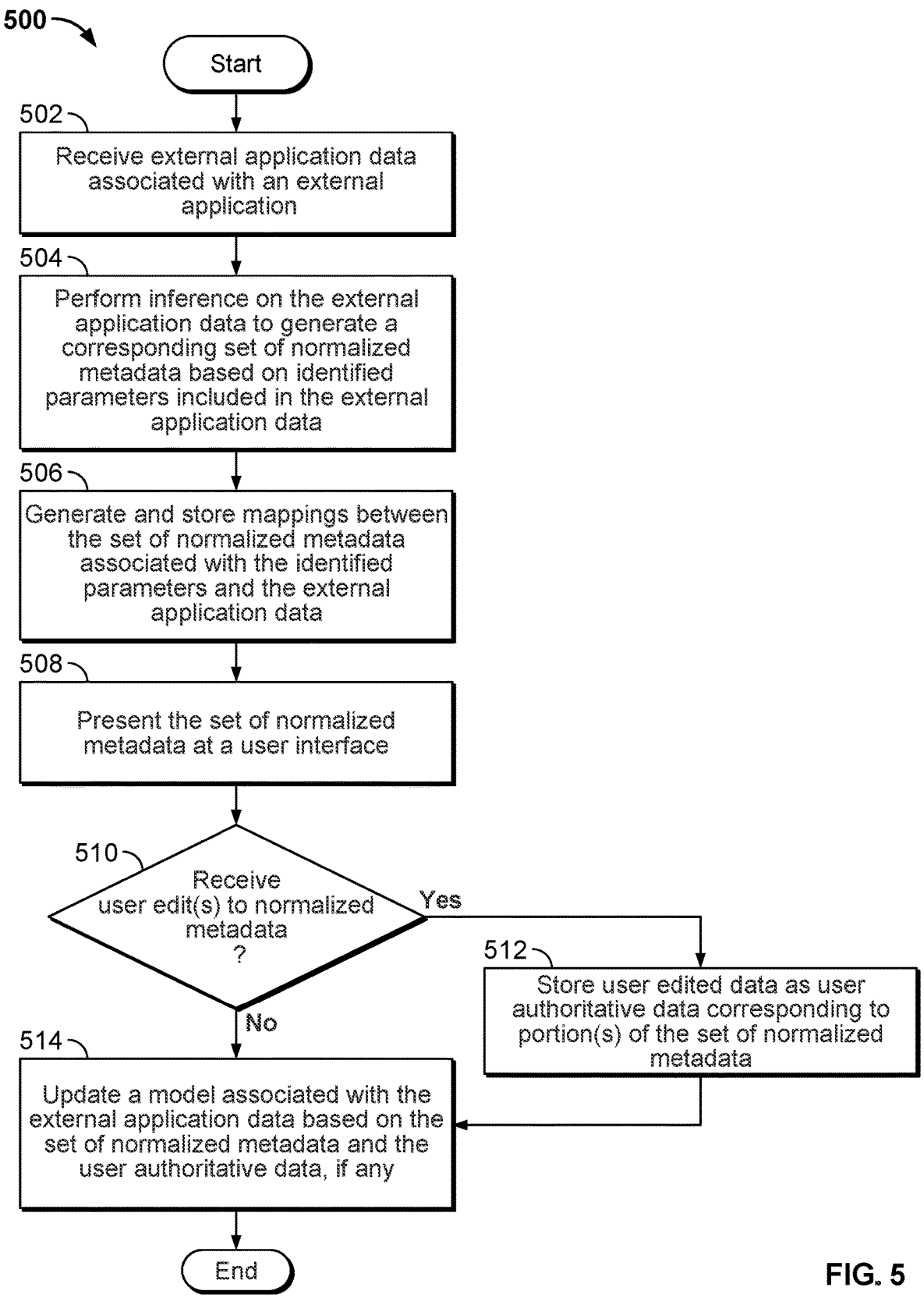
FIG. 5 is a flow diagram showing an example of a process for determining normalized metadata based on inferring from external application data.

FIG. 5 is a flow diagram showing an example of a process for determining normalized metadata based on inferring from external application data. In some embodiments, process 500 is implemented at a normalization and monitoring server such as normalization and monitoring server 108 of FIG. 1. In some embodiments, step 304 of process 300 of FIG. 3 may be implemented using process 500.

At 502, external application data associated with an external application is received. For example, a given organization's external application data associated with an external application is received using a process such as process 400 of FIG. 4.

At 504, inference on the external application data is performed to generate a corresponding set of normalized metadata based on identified parameters included in the external application data. Inference techniques are performed on the received external application data to identify parameters included in the external application data that match or correspond to (e.g., predetermined) normalized features (e.g., settings). For each normalized feature, inference is also performed on the identified corresponding parameter in the external application data to determine normalized attributes associated with the normalized feature.

The following are some example parameter-parameter value pairs in external application data that comprise system-level settings and the corresponding inferred normalized settings/attributes:

1. Parameter-parameter value: "require secure cookies": "yes"
   Inferred normalized metadata:
   Setting name: "secure cookies requirement"
   Setting value: "yes"
   Data type: "Boolean"
   Default Risk: "high"
2. Parameter-parameter value: "2FA_enabled": "False"
   Inferred normalized metadata:
   Setting name: "MFA requirement"
   Setting value: "False"
   Data type: "Boolean"
   Default Risk: "high"
3. Parameter-parameter value: "session+timeout": "60"
   Inferred normalized metadata:
   Setting name: "User session timeout period"
   Setting value: "60 minutes"
   Data type: "timestamp"
   Default Risk: "medium"

To determine the inferred normalized settings, the parameter is determined to match a root word or keyword associated with a normalized setting name. For example, the normalized attribute of data type associated with a normalized setting could be already predetermined for that particular normalized setting (e.g., the normalized setting of "secure cookies requirement" is predetermined to be of a Boolean data type). In another example, the normalized attribute of default risk associated with a normalized setting could be already predetermined for that particular normalized setting or otherwise inferred from other information such as the type of external application from which the external application data is obtained.

At 506, mappings between the set of normalized metadata and the external application data are generated and stored. Mappings between normalized features in the set of normalized metadata and parameters in the external application data are stored such that a reference to a normalized feature (e.g., that is included in a rule) can be used to locate the corresponding parameter in the external application data.

Referring to the above example, a mapping could be stored to associate the parameter of "require secure cookies" in the external application data and the normalized setting of "secure cookies requirement."

At 508, the set of normalized metadata is presented at a user interface. The user interface is presented to a (e.g., administrator) security actor associated with the organization.

At 510, it is determined whether user edit(s) to the set of normalized metadata are received. In the event that user edit(s) to the set of normalized metadata are received, control is transferred to 512. Otherwise, in the event that user edit(s) to the set of normalized metadata are not received, control is transferred to 514.

At 512, user edited data is stored at user authoritative data corresponding to portion(s) of the set of normalized metadata.

Referring to the above example, if a user (e.g., an administrative security actor of the organization) had submitted a user edit to change the inferred attribute of Default Risk: "medium" to Default Risk: "high" associated with the normalized setting of "secure cookies requirement," then the user submitted Default Risk: "high" normalized attribute is considered user authoritative data (which supplants inferred data) and is no longer changed by further instances of updating the normalized metadata.

At 514, a model associated with the external application data is updated based on the set of normalized metadata and the user authoritative data, if any.

Figure 6:
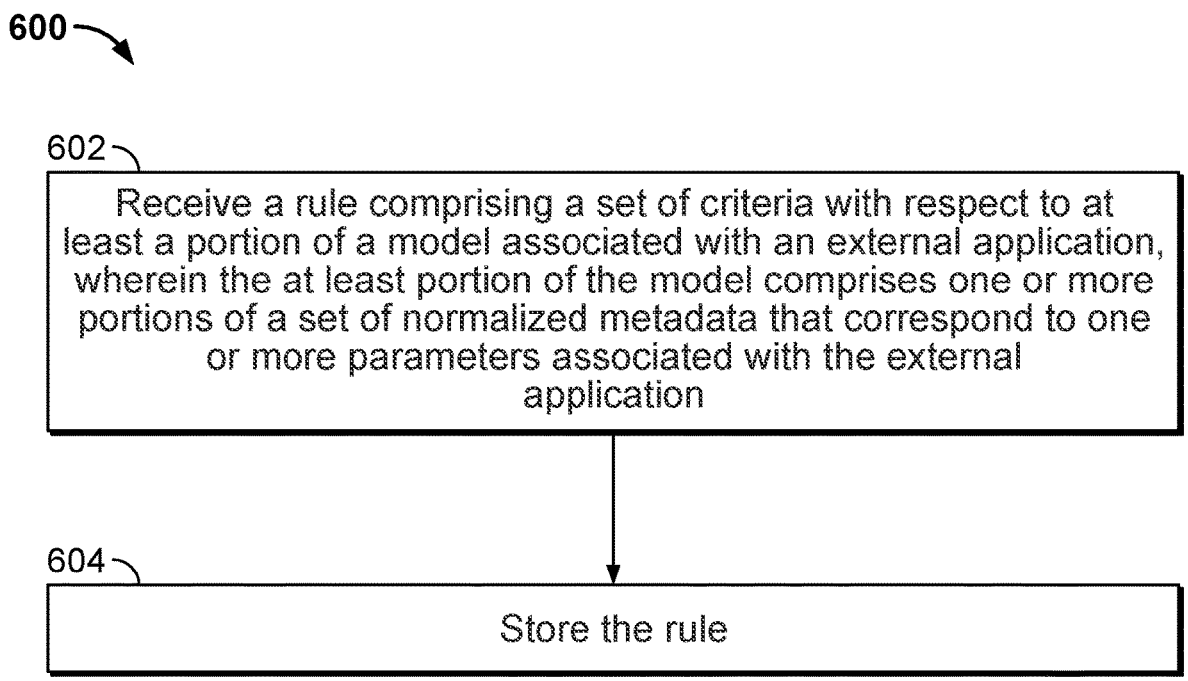
FIG. 6 is a flow diagram showing an example of a process for receiving a configuration of a rule that references normalized metadata associated with external application data.

FIG. 6 is a flow diagram showing an example of a process for receiving a configuration of a rule that references normalized metadata associated with external application data. In some embodiments, process 600 is implemented at a normalization and monitoring server such as normalization and monitoring server 108 of FIG. 1.

At 602, a rule comprising a set of criteria with respect to a least a portion of a model associated with an external application is received, wherein the at least portion of the model comprises one or more portions of a set of normalized metadata that correspond to one or more parameters associated with the external application. In some embodiments, a user interface is presented to a security actor associated with a given organization to enable the actor to configure rules that reference/specify normalized metadata that had previously been inferred from the organization's external application data that is stored at a corresponding external application. The set of criteria can describe activity that is of interest at the external application (e.g., such as which users are associated with permissions that meet the criteria) or conditions/activity that indicate violations of a desired configuration (e.g., such as whether the parameter value of a particular parameter is configured in a way that deviates from a desired configuration).

At 604, the rule is stored. As described herein, the stored rule can be later compared against (e.g., subsequently ingested) external application data to determine matching activity. For example, a rule that is configured to refer to the normalized setting of "MFA requirement" can also include a criterion that the parameter value in the external application data matches "false." This rule can be configured to detect when the parameter in the external application data that maps to the normalized setting of "MFA requirement" has a parameter value of "false," which is in violation of the organization security team's desired configuration of "true" (which is to require multifactor authentication for its users of the external application).

Figure 7:
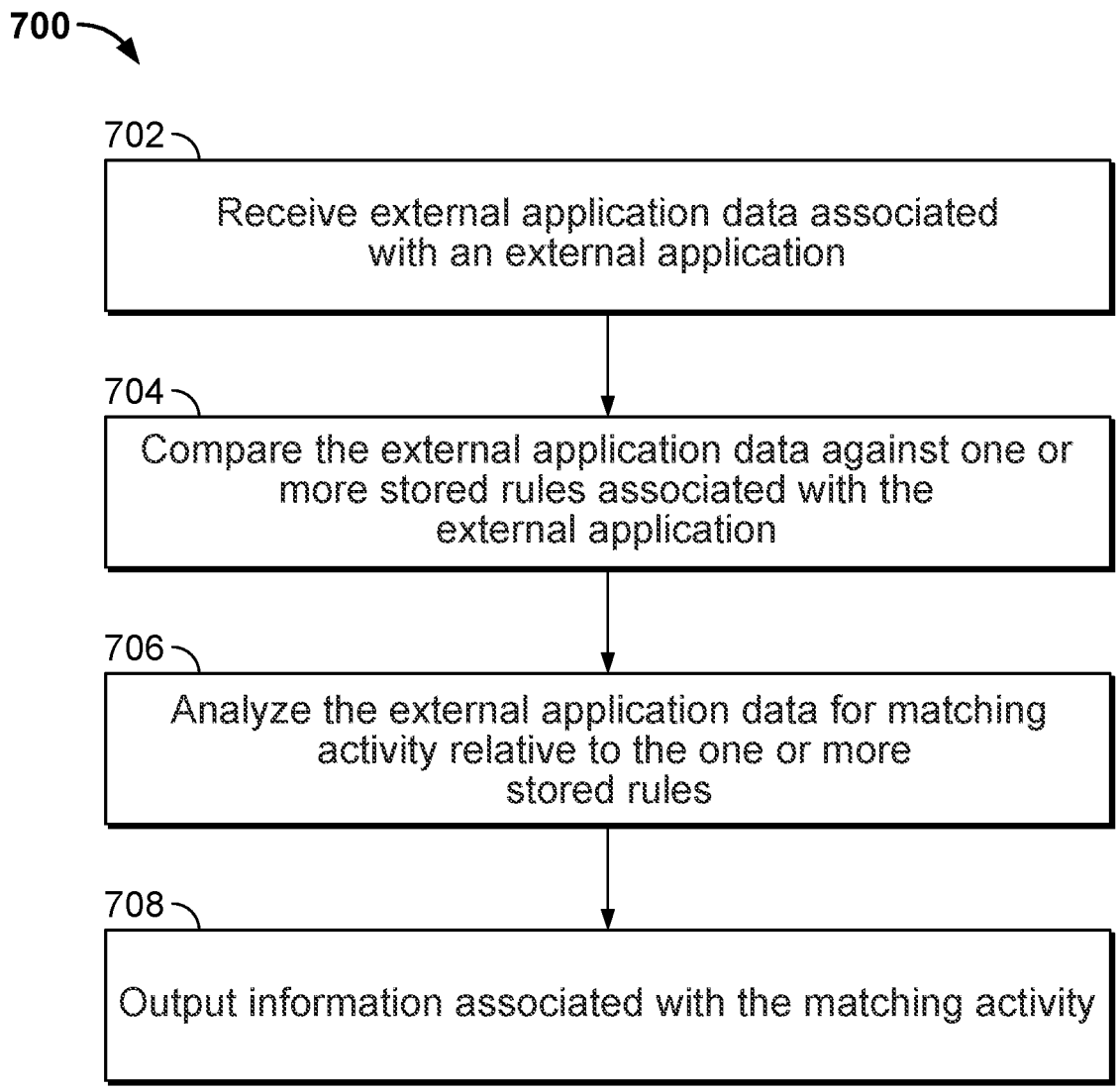
FIG. 7 is a flow diagram showing an example of a process for evaluating external application data against stored rules.

FIG. 7 is a flow diagram showing an example of a process for evaluating external application data against stored rules. In some embodiments, process 700 is implemented at a normalization and monitoring server such as normalization and monitoring server 108 of FIG. 1. In some embodiments, step 306 of process 300 of FIG. 3 may be implemented using process 700.

At 702, external application data associated with an external application is received. For example, a given organization's external application data associated with an external application is received using a process such as process 400 of FIG. 4.

At 704, the external application data is compared against one or more stored rules associated with the external application. In some embodiments, to compare the external application data against a stored rule (e.g., that was configured using a process such as process 600 of FIG. 6), the normalized features that are referenced by the stored rule are first determined. Then, mappings between those normalized features that are referenced by the rule and the parameters in the external application data are used to locate the parameter values of those parameters in the external application data.

At 706, the external application data is analyzed for matching activity relative to the one or more stored rules. The located parameter values are then compared to the set of criteria that is specified by the rule to determine whether the parameter values comprise matching activity.

At 708, information associated with the matching activity is output. As described above, matching activity to the rule may indicate a violation of a desired configuration or other information of interest. Information associated with the matching activity is output at a user interface for a security actor associated with the organization to consume (e.g., and to initiate remedial action).

Figure 8:
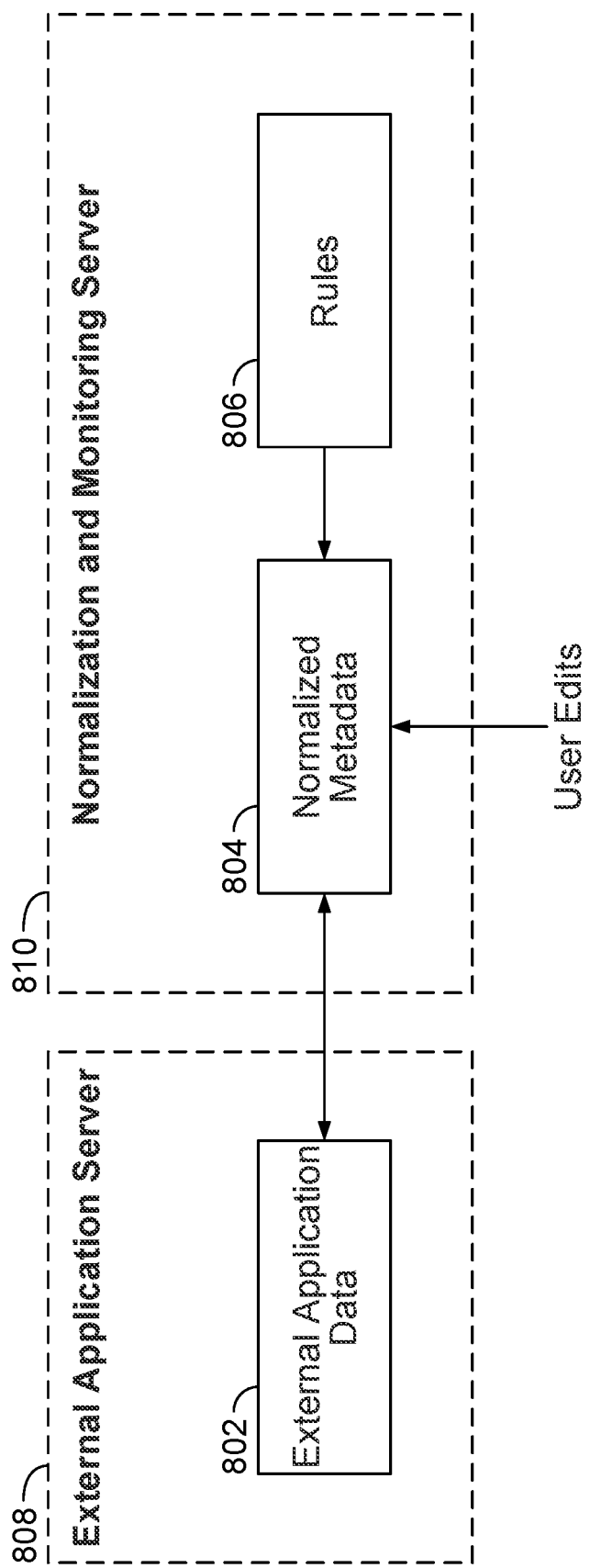
FIG. 8 is a diagram showing the relationship between external application data, normalized metadata, and rules.

FIG. 8 is a diagram showing the relationship between external application data, normalized metadata, and rules. External application data 802 is stored at external application server 808. Normalization and monitoring server 810 is configured to ingest external application data 802 associated with a given organization from external application server 808 and infer normalized metadata 804 from external application data 802. Mappings between corresponding parameters of external application data 802 and normalized features of normalized metadata 804 are stored. Normalized metadata 804 can be modified by a user at a user interface and the user modified data becomes user authoritative data that is no longer updated through inference. Rules 806 can be configured at normalization and monitoring server 810 and where a rule can reference/specify at least a portion of normalized metadata 804 as well as a set of criteria. When normalization and monitoring server 810 evaluates a rule of rules 806 against external application data 802 obtained from external application server 808, normalization and monitoring server 810 is configured to determine the feature of normalized metadata 804 that is specified by the rule and then use a stored mapping between that feature of normalized metadata 804 and the corresponding parameter in external application data 802 to locate the corresponding parameter. Then normalization and monitoring server 810 is configured to compare the parameter value corresponding to the located parameter against the set of criteria in the rule to determine whether the parameter value matches the set of criteria. If the parameter matches the set of criteria, this matching activity may be presented by normalization and monitoring server 810 at a user interface for a security actor associated with the organization to review.

Figure 9:
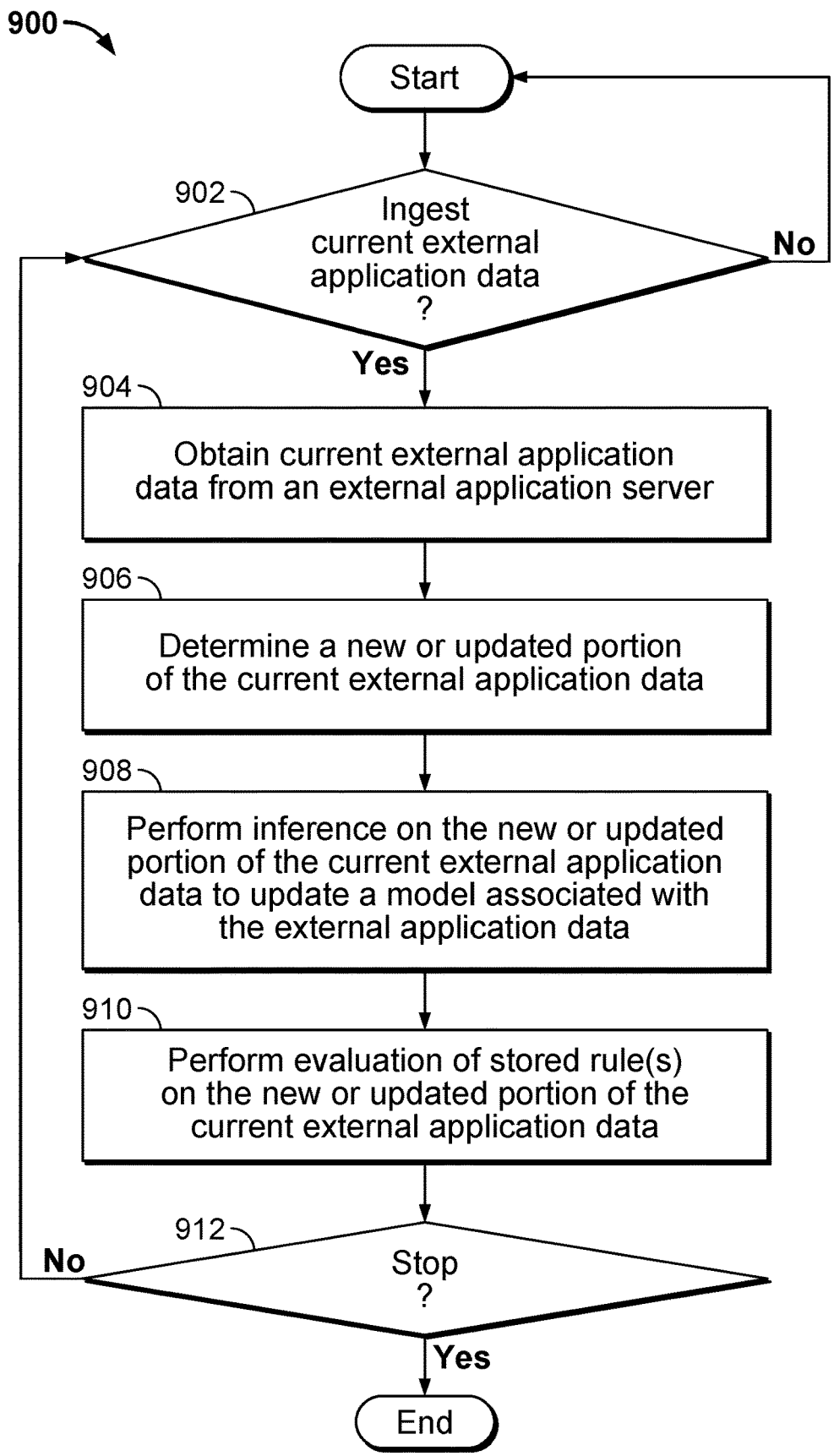
FIG. 9 is a flow diagram showing an example of a process for continuously inferring updating normalized metadata and evaluating stored rules against ingested external application data.

FIG. 9 is a flow diagram showing an example of a process for continuously inferring updating normalized metadata and evaluating stored rules against ingested external application data. In some embodiments, process 900 is implemented at a normalization and monitoring server such as normalization and monitoring server 108 of FIG. 1.

Process 900 shows an example process of how the current instance of a given organization's external application data can be regularly obtained. Additionally, process 900 shows how each instance of an obtained current set of external application data can be used to infer updated normalized metadata as well as be evaluated against stored rules. Continuously inferring from the current external application data enables the normalized metadata to be current to the parameters defined in the current external application data and therefore allows rules to comprehensively monitor activity at the external application.

At 902, whether to ingest current external application data is determined. In the event that it is determined to ingest current external application data, control is transferred to 904. Otherwise, in the event that it is determined not to ingest current external application data, 902 is returned to at a later time. In some embodiments, a given organization's current external application is ingested on a configured interval (e.g., every hour). In some embodiments, a given organization's current external application is ingested in response to a trigger event such as, for example, a user request.

At 904, current external application data is obtained from an external application server. In some embodiments, the organization's current external application data is ingested from a server of a corresponding external application using a process such as process 400 of FIG. 4.

At 906, a new or updated portion of the current external application data is determined. In some embodiments, a portion of the current external application data that has changed relative to the last instance of the external application data that was ingested is identified. For example, changed portions of the current external application data can be identified based on markers indicating change or a lack thereof that are included in the current external application data or based on a comparison against the stored last instance of the external application data.

At 908, inference is performed on the new or updated portion of the current external application data to update a model associated with the external application data. A process of inference, such as, for example, process 500 of FIG. 5, is performed on the new or updated portion of the current external application data to determine new normalized metadata features. In addition to determining new parameters within each instance of the current external application data, inference of each subsequent instance of the current external application data can also determine new parameter values set for a previously identified parameter, which could lead to identifying additional possible values or a new range of values for a normalized feature that maps to that previously identified parameter.

At 910, evaluation of stored rule(s) on the new or updated portion of the current external application data is performed. A process, such as, for example, process 700 of FIG. 7, of evaluating stored rules against the updated portion of the current external application data is performed to determine matching activity.

At 912, whether subsequent inference and evaluation of rules against the current external application data is to continue is determined. In the event that subsequent inference and evaluation of rules against the current external application data is to continue, control is returned to 902. Otherwise, in the event that subsequent inference and evaluation of rules against the current external application data is to stop, process 900 ends. For example, process 900 could end if a security actor associated with the organization instructs the normalization and monitoring server to no longer monitor activity at the external application.

Figure 10:
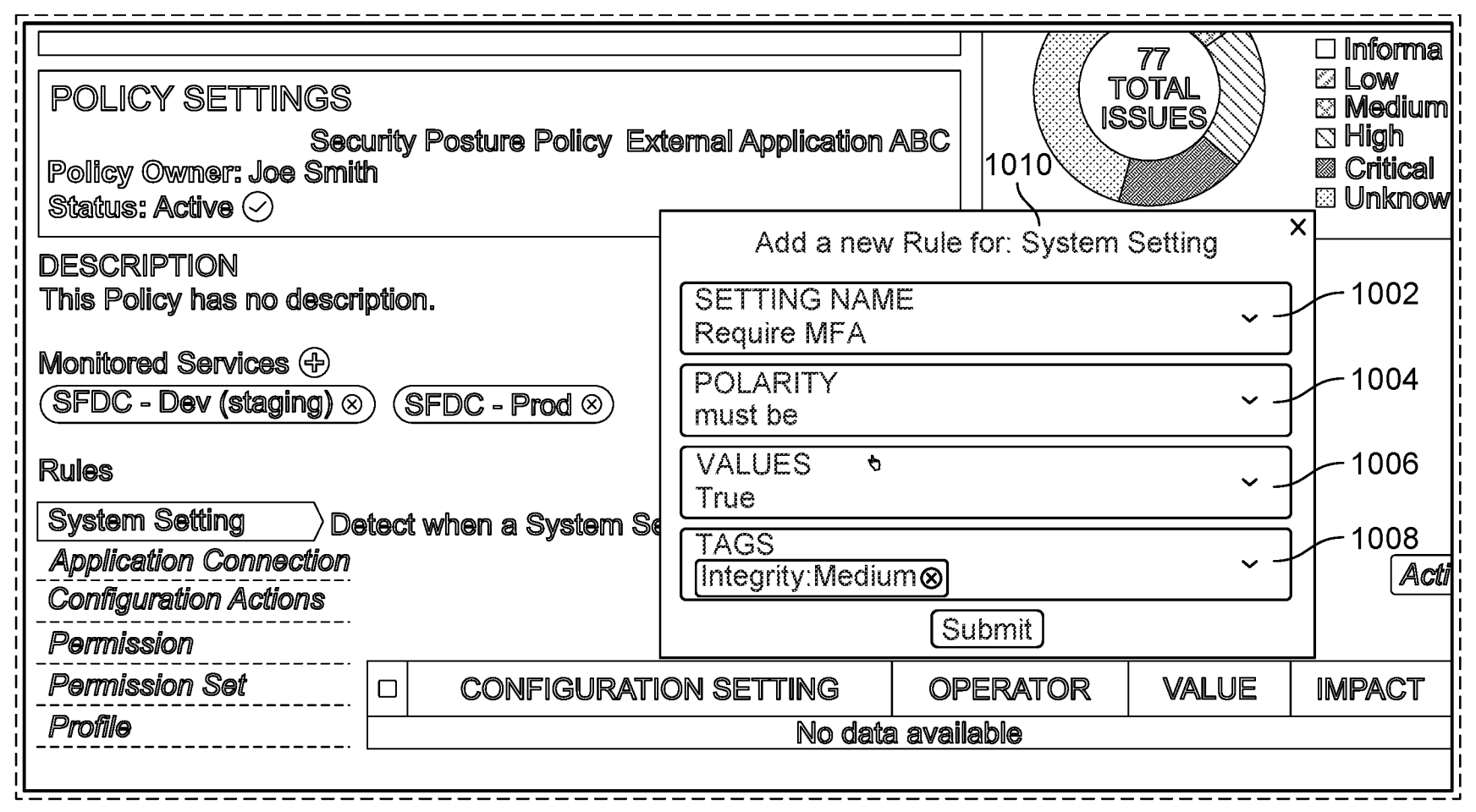

FIG. 10 is a diagram showing an example user interface to enable a security actor associated with an organization to configure a rule using a portion of normalized metadata that is derived from external application data associated with an external application. In response to a user selection to configure a new rule associated with system settings at External Application ABC, pop-up window 1010 was presented. Setting Name drop-down menu 1002 enables the security actor to select a normalized system setting from a set of normalized metadata that was previously inferred from external application data obtained from External Application ABC. In the example of FIG. 10, the selected normalized setting in Setting Name drop-down menu 1002 is "Require MFA." Polarity drop-down menu 1004 enables the security actor to select a desired criteria associated with the "Require MFA" normalized setting that is either "must be" or "must not be." In the example of FIG. 10, the value of "must be" was selected in the Polarity drop-down menu 1004. Values drop-down menu 1006 enables the security actor to select a desired setting value to the "Require MFA" normalized setting. Because the "Require MFA" normalized setting is associated with the inferred data type of Boolean, the only possible options in the Values drop-down menu 1006 are "True" and "False." In the example of FIG. 10, the value of "True" was selected in the Values drop-down menu 1006 because the security actor wanted to indicate that the desired setting value to the "Require MFA" normalized setting must always be true (i.e., the multifactor authentication requirement must always be configured at External Application ABC). Tags drop-down menu 1008 enables the security actor to associate a tag associated with the rule such that, for example, such tags can be associated with any matching activity that is determined when the rule is later evaluated against external application data. In summary, the rule that has been configured by the selections shown in FIG. 10 sets up a criterion that detects if the value of the multifactor authentication parameter of the external application data that maps to the "Require MFA" normalized setting is not set to true (i.e., where the setting of "true" requires multifactor authentication to be performed by users associated with the organization at External Application ABC). During an evaluation of the rule against external application data (e.g., as performed using a process such as process 700 of FIG. 7) obtained from External Application ABC, if the parameter value of the parameter that maps to the "Require MFA" normalized setting is set to false, then that discrepancy will form a matching activity (e.g., a violation) to the rule. Information associated with the discrepancy will be presented at another user interface.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   receive external application data associated with an external application;
   determine normalized metadata based at least in part on inferring from the external application data;
   use the normalized metadata to monitor activities at the external application;
   present the normalized metadata at a user interface;
   receive a user edit to the normalized metadata; and
   store the user edit as user authoritative data in the normalized metadata, wherein the user authoritative data will not be updated with subsequently inferred data; and
   a memory coupled to the processor and configured to provide the processor with instructions.

2. The system of claim 1, wherein to receive the external application data associated with the external application comprises to obtain the external application data from an endpoint.

3. The system of claim 1, wherein to receive the external application data associated with the external application comprises to obtain the external application data from an address.

4. The system of claim 1, wherein to determine the normalized metadata based at least in part on inferring from the external application data comprises to determine a correspondence between an identified parameter from the external application data and a normalized feature from the normalized metadata.

5. The system of claim 4, wherein the processor is further configured to store a mapping between the identified parameter from the external application data and the normalized feature from the normalized metadata.

6. The system of claim 4, wherein the processor is further configured to determine a set of attributes associated with the normalized feature.

7. The system of claim 1, wherein the processor is further configured to:
   receive a rule comprising a set of criteria with respect to at least a portion of the normalized metadata; and
   store the rule.

8. The system of claim 7, wherein to use the normalized metadata to monitor the activities at the external application comprises to evaluate the rule against subsequently received external application data.

9. The system of claim 8, wherein to evaluate the rule against the subsequently received external application data comprises to determine whether the at least portion of the normalized metadata matches the set of criteria.

10. The system of claim 1, wherein the external application data comprises one or more of the following: system settings, user permissions, audit events, data settings, access control lists, schema, and schema settings.

11. A method, comprising:
    receiving external application data associated with an external application;
    determining normalized metadata based at least in part on inferring from the external application data;
    using the normalized metadata to monitor activities at the external application;
    presenting the normalized metadata at a user interface;
    receiving a user edit to the normalized metadata; and
    storing the user edit as user authoritative data in the normalized metadata, wherein the user authoritative data will not be updated with subsequently inferred data.

12. The method of claim 11, wherein receiving the external application data associated with the external application comprises obtaining the external application data from an endpoint.

13. The method of claim 11, wherein receiving the external application data associated with the external application comprises obtaining the external application data from an address.

14. The method of claim 11, wherein determining the normalized metadata based at least in part on inferring from the external application data comprises determining a correspondence between an identified parameter from the external application data and a normalized feature from the normalized metadata.

15. The method of claim 14, further comprising storing a mapping between the identified parameter from the external application data and the normalized feature from the normalized metadata.

16. The method of claim 14, further comprising determining a set of attributes associated with the normalized feature.

17. The method of claim 11, further comprising:
receiving a rule comprising a set of criteria with respect to at least a portion of the normalized metadata; and
storing the rule.

18. A computer program product, the computer program product comprises a non-transitory computer readable storage medium and comprising computer instructions for:
receiving external application data associated with an external application;
determining normalized metadata based at least in part on inferring from the external application data;
using the normalized metadata to monitor activities at the external application;
presenting the normalized metadata at a user interface;
receiving a user edit to the normalized metadata; and
storing the user edit as user authoritative data in the normalized metadata, wherein the user authoritative data will not be updated with subsequently inferred data.

* * * * *

UNITED STATES PATENT AND TRADEMARK OFFICE
CERTIFICATE OF CORRECTION

| | | |
|---|---|---|
| PATENT NO. | : 11,899,779 B1 | Page 1 of 1 |
| APPLICATION NO. | : 17/546871 | |
| DATED | : February 13, 2024 | |
| INVENTOR(S) | : Timothy Bach and Brian Soby | |

It is certified that error appears in the above-identified patent and that said Letters Patent is hereby corrected as shown below:

On the Title Page

Column 1, item (54) and in the Specification Column 1, Lines 1-2 Title, delete "NORMALIZING APPLICATION EXTERNAL DATA", insert -- NORMALIZING EXTERNAL APPLICATION DATA --.

Signed and Sealed this
Tenth Day of June, 2025

Coke Morgan Stewart
*Acting Director of the United States Patent and Trademark Office*